Patented Mar. 14, 1933

1,901,630

UNITED STATES PATENT OFFICE

ROLLIN J. BYRKIT, JR., OF MARSHALLTON, DELAWARE, ASSIGNOR TO HERCULES POWDER COMPANY, OF WILMINGTON, DELAWARE, A CORPORATION OF DELAWARE

METHOD OF HYDROGENATING ABIETIC ACID ESTER

No Drawing.   Application filed March 8, 1932. Serial No. 597,636.

This invention relates to an improved method for hydrogenating abietic acid esters.

In accordance with the method embodying this invention an abietic acid ester to be hydrogenated is subjected to heating under pressure in the presence of hydrogen and a metal chromite, which will act catalytically to promote the addition of hydrogen to its unsaturated bonds, thus reducing its unsaturation.

The method in accordance with this invention is applicable to abietic acid esters generally as, for example, to esters produced by reaction of abietic acid, wood or gum rosin, or wood or gum rosin which has been refined by any well known manner, as by extraction with a selective solvent, distillation, etc., etc. or otherwise treated, with a monohydric alcohol, as ethyl, methyl, amyl, propyl, butyl, ethylene glycol monoacetate, cyclohexanol, propylene glycol monoethyl ether, fenchyl alcohol, borneol, stearol, ethylene glycol monomethyl ether, ethylene glycol monoabietate, etc., etc., a polyhydric alcohol, as glycerol, thylene glycol, propylene glycol, pentaerythrite, etc., etc., a phenol, as carbolic acid, resorcinol, cresol, naphthol, etc., etc.

Abietic acid esters for hydrogenation in accordance with this invention may be prepared in any well known manner, as, for example, by direct heating of the alcohol with rosin at a temperature of say about 200–300° C., the reaction being carried out under pressure except in the case of a relatively non-volatile alcohol; heating the alcohol and rosin under pressure in the presence of a catalyst, as p-toluene sulphonic acid, hydrogen chloride, zinc dust, zinc acetate, etc., etc.; heating sodium resinate with the alkyl chloride or alkyl sulphate of the alcohol, or other suitable method.

The metal chromite for use in carrying out this invention may be of any metal chromite adapted to hydrogenation, or a mixture thereof. Thus, the metal chromite may be cobalt, nickel, zinc, etc., chromite or a mixture thereof. In proceeding the metal chromite may be reduced with hydrogen before its use or it may be employed without previous reduction. The metal chromite catalyst will be used desirably in powdered form where the hydrogenation of the ester is carried out as a batch process and may desirably be in granular form or in the form of porous briquettes when the hydrogenation of the ester is carried out as a continuous process. The catalyst may be supported upon kieselguhr, silica gel or other suitable support where necessary or desirable.

The metal chromite for use in carrying out the method in accordance with this invention may be obtained from any suitable source or prepared in any suitable manner. Thus, for example, copper chromite may be prepared, for example, by adding to one-half mole of ammonium dichromate in 1 liter of water containing sufficient ammonium hydroxide to change its color from orange to yellow, 1 mole cupric nitrate trihydrate in 300 cc. of water. The precipitant formed is filtered off, water washed, dried at 100° C. and then gradually heated to effect its decomposition, yielding a black fine powder comprising copper chromite. If desired, the copper chromite may be washed with dilute acetic acid, water washed and finally dried.

For the production of a mixed metal chromite catalyst, for example, that of copper and zinc may be prepared by dissolving one mol of the desired proportions of the mixed nitrates of copper and zinc in a liter of water and adding thereto a second solution containing 100 g. of chromic anhydride and 140 g. of 28% ammonium hydroxide in a liter of water, additional ammonia being added if necessary for the neutralization. The precipitate is filtered off, water washed, dried and finally calcined at around 400° C.

In practice the metal chromite, which will be used as a catalyst, may be used in widely varying amount, but desirably may be used in amount within about the range 0.5%–10.0% by weight or within the narrower range of about 2.0%–4.0% by weight.

As illustrative of the practical adaptation of this invention, for example, 120 parts of ethyl abietate are agitated with about 4 parts by weight of copper chromite under a temperature of about 150° C. which may be gradually increased to about 210° C. at the end of the reaction period. During the heating hydrogen is bubbled through the ester under a pressure of about 1000–1200 pounds per square inch. The absorption of hydrogen will correspond to the formation of dihydroethyl abietate, but likely some tetrahydroethyl abietate will also be formed.

Similarly, methyl abietate, for example, may be hydrogenated in accordance with this invention by heating with say 2.0%–4.0% by weight of copper chromite, at a temperature of say 125–180° C. while passing hydrogen through the ester under a pressure of say 200–800 pounds per square inch. The product will be chiefly dihydromethyl abietate.

The method in accordance with this invention will be found especially adaptable in effecting the hydrogenation of esters which have been prepared through the use of esterification catalysts, such as p-toluene sulphonic acid, which may operate to poison other hydrogenation catalysts.

What I claim and desire to protect by Letters Patent is:

1. The method of hydrogenating a rosin ester which includes heating an abietic acid ester under pressure in the presence of hydrogen and a metal chromite adapted to promote the addition of hydrogen to the unsaturated bonds of the rosin ester.

2. The method of hydrogenating a rosin ester which includes heating an abietic acid ester under pressure in the presence of hydrogen and a metal chromite adapted to promote the addition of hydrogen to the unsaturated bonds of the rosin ester in amount within about the range 0.5%–10% by weight.

3. The method of hydrogenating a rosin ester which includes heating an abietic acid ester at a temperature within about the range 125–225° C. under pressure within about the range 200–2000 pounds per square inch in the presence of hydrogen and a metal chromite adapted to promote the addition of hydrogen to the unsaturated bonds of the rosin ester.

4. The method of hydrogenating a rosin ester which includes heating an abietic acid ester under pressure in the presence of hydrogen and copper chromite.

5. The method of hydrogenating a rosin ester which includes heating an abietic acid ester under pressure in the presence of hydrogen and copper chromite in amount within about the range 0.5%–10% by weight.

6. The method of hydrogenating a rosin ester which includes heating an abietic acid ester at a temperature within about the range 125–225° C. under pressure within about the range 200–2000 pounds per square inch in the presence of hydrogen and copper chromite.

7. The method of hydrogenating a rosin ester which includes heating the rosin ester at a temperature within about the range 125–225° C. under pressure within about the range 200–2000 pounds per square inch in the presence of hydrogen and copper chromite.

8. The method of hydrogenating a rosin ester which includes heating an abietic acid ester at a temperature within about the range 125–225° C. under pressure within about the range 200–2000 pounds per square inch in the presence of hydrogen and copper chromite in amount within about the range 0.5%–10% by weight.

9. The method of hydrogenating a rosin ester which includes heating a monohydric alcohol ester of abietic acid under pressure in the presence of hydrogen and copper chromite.

10. The method of hydrogenating a rosin ester which includes heating a polyhydric alcohol ester of abietic acid under pressure in the presence of hydrogen and copper chromite.

11. The method of hydrogenating a rosin ester which includes heating the abietic acid ester of a phenol under pressure in the presence of hydrogen and copper chromite.

12. The method of hydrogenating a rosin ester which includes heating ethyl abietate at a temperature within about the range 150–210° C. under pressure within about the range 1000–1200 pounds per square inch in the presence of hydrogen and copper chromite.

13. The method of hydrogenating a rosin ester which includes heating methyl abietate at a temperature within about the range 125–180° C. under a pressure within about the range 200–800 pounds per square inch in the presence of hydrogen and copper chromite.

14. The method of hydrogenating a rosin ester which includes heating an abietic acid ester under pressure in the presence of hydrogen and zinc chromite.

15. The method of hydrogenating a rosin ester which includes heating an abietic acid ester under pressure in the presence of hydrogen and nickel chromite.

16. The method of hydrogenating a rosin ester which includes heating the rosin ester at a temperature within about the range 125–225° C. under pressure within about the range 200–2000 pounds per square inch in the presence of hydrogen and zinc chromite.

17. The method of hydrogenating a rosin ester which includes heating the rosin ester at a temperature within about the range 125–225° C. under pressure within about the range 200–2000 pounds per square inch in the presence of hydrogen and nickel chromite.

18. The method of hydrogenating a rosin ester which includes heating ethyl abietate under pressure in the presence of hydrogen and copper chromite.

19. The method of hydrogenating a rosin ester which includes heating methyl abietate under pressure in the presence of hydrogen and copper chromite.

20. The method of hydrogenating a rosin ester which includes heating a monohydric alcohol ester of abietic acid under pressure in the presence of hydrogen and a metal chromite adapted to promote the addition of hydrogen to the unsaturated bonds of the rosin ester.

21. The method of hydrogenating a rosin ester which includes heating a polyhydric alcohol ester of abietic acid under pressure in the presence of hydrogen and a metal chromite adapted to promote the addition of hydrogen to the unsaturated bonds of the rosin ester.

22. The method of hydrogenating a rosin ester which includes heating an abietic acid ester under pressure in the presence of hydrogen and a metal hydrogenation catalyst containing essentially a mixture of metal chromites adapted to promote the addition of hydrogen to unsaturated bonds of the rosin ester.

23. The method of hydrogenating a rosin ester which includes heating an abietic acid ester at a temperature within about the range 125–225° C. under pressure within about the range 200–2000 pounds per square inch in the presence of hydrogen and a metal hydrogenation catalyst containing essentially a mixture of metal chromites adapted to promote the addition of hydrogen to the unsaturated bonds of the rosin ester.

In testimony of which invention, I have hereunto set my hand, at Wilmington, Delaware, on this 3rd day of March, 1932.

ROLLIN J. BYRKIT, Jr.